US008519075B2

United States Patent
Laurino

(10) Patent No.: US 8,519,075 B2
(45) Date of Patent: Aug. 27, 2013

(54) POLYCARBONATE RESIN, AND METHOD OF USE OF, POLY (2-OCTADECYL-BUTANEDIOIC ACID) AND THE SALTS AND ESTERS THEREOF

(76) Inventor: Joseph P. Laurino, Tierra Verde, FL (US)

( * ) Notice: Subject to any disclaimer, the term of this patent is extended or adjusted under 35 U.S.C. 154(b) by 1093 days.

(21) Appl. No.: 12/459,308

(22) Filed: Jun. 30, 2009

(65) Prior Publication Data

US 2010/0222542 A1 Sep. 2, 2010

Related U.S. Application Data

(63) Continuation of application No. 11/998,612, filed on Nov. 30, 2007, now Pat. No. 7,964,688.

(51) Int. Cl.
*C08G 64/04* (2006.01)
*C08F 222/02* (2006.01)

(52) U.S. Cl.
USPC .......................................... 526/319; 528/196

(58) Field of Classification Search
USPC .......................................... 526/319; 528/196
See application file for complete search history.

(56) References Cited

U.S. PATENT DOCUMENTS 3,560,456 A 2/1971 Hazen et al.
7,541,419 B2 6/2009 Ishikawa
2008/0287019 A1* 11/2008 Casas-Sanchez et al. ...... 442/60

FOREIGN PATENT DOCUMENTS
WO WO 9320126 10/1993

OTHER PUBLICATIONS

The IUPAC Compendium of Chemical Terminology, 66, 83 (1997).
Engineered Materials Handbook—Desk edition (1995) ASM International, ISBN 0871702835. p. 369.
Howdeshell, K.L., et. al. "Bisphenol A is Released from Used Polycarbonate Animal Cages into Water at Room Temperature." Environ. Health Perspect. 111(9):1180-1187 (2003).
Raigorodskii, I.M., et.al. Soedin., Ser. A. 37(3):445 (1995).
Katz, A.R., et. al., Surg. Gynecol. Obstet. 161:312 (1985).
Rodeheaver, G.T., et.al., Am. J. Surg. 154:544 (1987).
Kawaguchi, T., et. al., Chem. Pharm. Bull. 31, 1400:4157 (1983).
Kojima, T., et. al., Chem. Pharm. Bull. 32:2795 (1984).
Zhu, K.J., et.al., Macromolecules. 24:1736 (1991).
Schnell, H. Chemistry and Physics of Polycarbonates, Wiley, New York, 1964, p. 9.
Inoue, S., Koinuma, H., Tsuruta, T. Makromol. Chem. 120:210 (1969).
(Hocker, H., Macromol. Rep., A31 (Suppls. 6&7), 685 (1994).
Pokharkar, V., Sivaram, S. Polymer, 36:4851 (1995).
Soga, K. et. al., Makromol. Chem. 178:2747 (1977).
Rokicki, G., et.al., J. Polym. Sci., Polym. Chem. Ed., 20:967 (1982).
Rokicki, G., et. al., Polym. J. 14:839 (1982).
Chen, X., et. al., Macromolecules, 30:3470-3476 (1997).

* cited by examiner

*Primary Examiner* — Ling Choi
*Assistant Examiner* — Chun-Cheng Wang
(74) *Attorney, Agent, or Firm* — Edward P Dutkiewicz

(57) ABSTRACT

A polymer comprising a polymer backbone. The polymer backbone has a plurality of carbon atoms. There are two lipophobic carboxylate groups or carboxylic acid groups per repeating unit being coupled to separate carbon atoms of the backbone.

4 Claims, 3 Drawing Sheets

Alternate Synthesis of 2-Octadecyl-Butanedioic Acid Analogs

Figure 1:
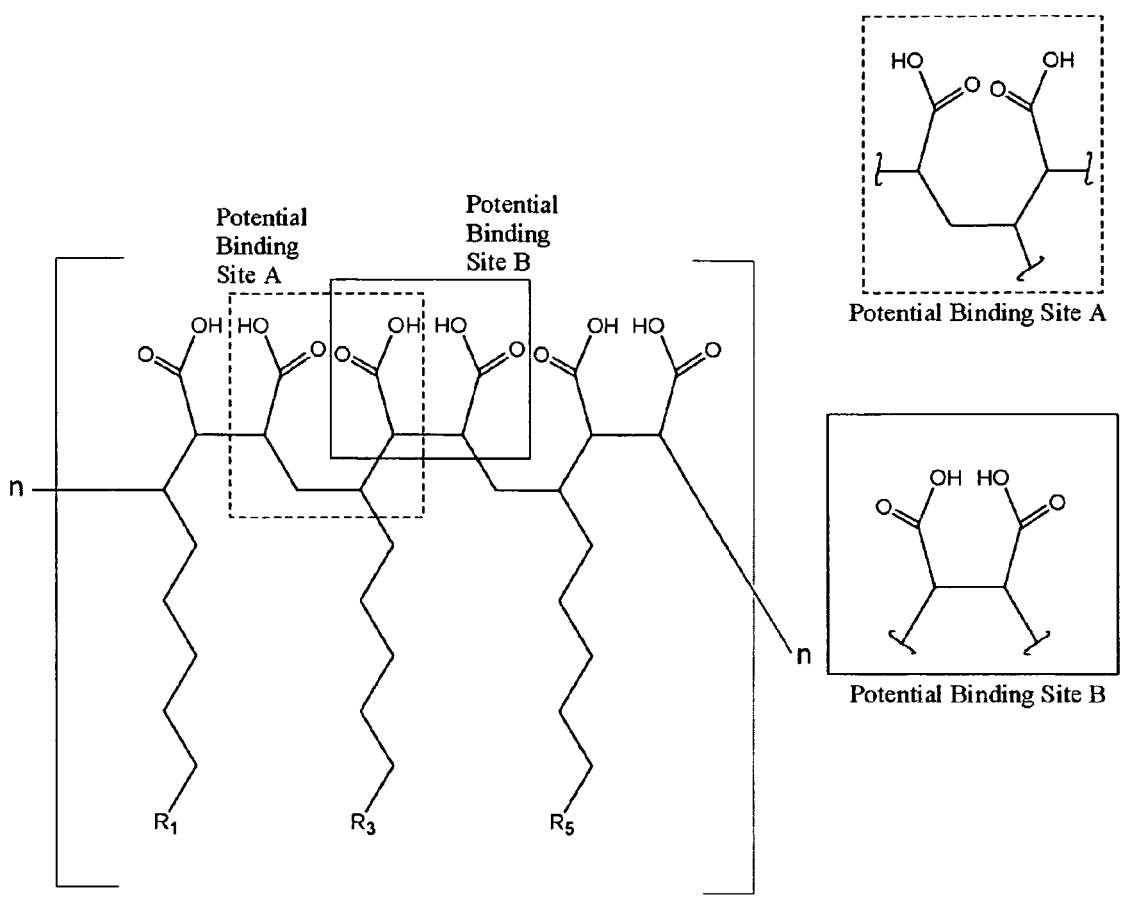

If n=0, 2+4 spacing results
If n=1, 4+6 spacing

R', R'', R''' = alkyl, alkenyl, alkynyl, aryl

Polyester →(water, heat, base or acid)→ Polycarboxylate or Polycarboxylic acid

Aromatic Polycarbonate Synthesized from Bisphenol-A and Phosgene

POLYCARBONATE RESIN, AND METHOD OF USE OF, POLY (2-OCTADECYL-BUTANEDIOIC ACID) AND THE SALTS AND ESTERS THEREOF

RELATED PATENT APPLICATIONS

This application is a Continuation in Part, based upon U.S. Utility patent application Ser. No. 11/998,612 filed Nov. 30, 2007 now U.S. Pat. No. 7,964,688. Applicant claims the priority of the above referenced parent patent application.

RULE 1.78 (F) (1) DISCLOSURE

The Applicant has not submitted a related pending or patented non-provisional application within two months of the filing date of this present application. The invention is made by a single inventor, so there are no other inventors to be disclosed. This application is not under assignment to any other person or entity at this time.

BACKGROUND OF THE INVENTION

1. Field of the Invention

The present invention relates to Poly(2-Octadecyl Butanedioic acid) and the salts and esters thereof, and more particularly pertains to the uses of Poly(2-Octadecyl Butanedioate) and Poly(2-Octadecyl Butanedioic Acid) as polycarbonate organic polymers. This application pertains to the uses of the herein described compound in ways heretofore not disclosed or taught.

2. Description of the Prior Art

Organic polymers (plastics) are amorphous solids that characteristically become brittle on cooling and soft on heating. The temperature at which this structural transition takes place is known as the glass transition temperature. More specifically, the IUPAC Compendium of Chemical Terminology defines the glass transition temperature as a pseudo second order phase transition in which a super-cooled melt yields a glassy structure with properties similar to those of crystalline materials upon cooling (The IUPAC Compendium of Chemical Terminology, 66, 83 (1997)). Above this temperature, these materials become soft and capable of deformation without fracture due to the weakening of the secondary, non-covalent bonds between the polymer chains. This characteristic enhances the usefulness of a subset of plastic materials known as thermoplastics. Those schooled in the art know that the transition temperature for a polymer can be influenced by the addition of plasticizers, other polymeric substances, the cooling-ratio, and its molecular weight distribution. The mean glass transition temperature for polycarbonate is reported to be 145° C. (Engineered Materials Handbook-Desk edition (1995) ASM International, ISBN 0871702835. p. 369).

Many polymers, including polycarbonates, can be used for several molding processes including, injection, extrusion, and extrusion/injection blow molding. In injection molding, these thermoplastics are heated and then pressed into a mold to form different shape plastics. In extrusion molding, the polymer is melted into a liquid and forced through a die forming a long continuous piece of plastic with the shape of the die. When the extruded material cools, it forms a solid with the desired shape. Blow molding is a process by which hollow plastic parts are formed either by injection or extrusion. Those schooled in the art know that the optimum polymer melt temperature, die and mold temperature, and annealing conditions must be empirically determined for each plastic material and mold/die configuration. Polycarbonate resins are tough thermoplastics with very high visual clarity and exceptionally high levels of impact strength and ductility. Polycarbonate resins, or "Polycarbonates" also possess inherent fire resistance, relatively good resistance to UV light, good resistance to aqueous solutions of organic and inorganic acids and good resistance salts and oxidizing agents, but offer limited resistance to organic solvents. Typical properties of polycarbonates include exceptional machine-ability, low water absorption, good impact resistance, non-toxic formulations, good thermal properties, superior dimensional stability, heat resistance, and transparency with thicknesses up to 2".

Currently, major markets for polycarbonate resins include the electrical/electronic sectors, such as computer and business equipment and optical disks, sheet and glazing products, and the automotive industry. Other products include safety helmets, safety shields, housing components, household appliances, sporting goods, and aircraft and missile components. Specific product applications include doors, equipment enclosures, greenhouses, high voltage switches, high temperature windows, instrument gauge covers, automotive instrument panels, light bezels, pumps and valves, connectors, gears, internal mechanical parts, relays, rollers, lenses, sight glasses, light shields, machine guards, patio roofs, photo lens covers, replacement for metal components of safety equipment, guards, helmets, shields, signs, solar rods, thermal insulation, thermometer housings, and window glazing. Polycarbonates have also received approval from the U.S. Food and Drug Administration for use in medical instruments, medical implants, and tubing.

Polycarbonate, while broadly used, is limited in specific instances. As previously mentioned, polycarbonate typically shows good resistance (at room temperature) to water, dilute organic and inorganic acids, neutral and acid salts, and aliphatic and cyclic hydrocarbons. It does not resist attacks from alkalines, amines, ketones, esters, and aromatic hydrocarbons.

Several US retailers have begun to remove polycarbonate food and beverage containers from their shelves due to concerns that small amounts of bisphenol-A (BPA), a component of polycarbonates, can be released from the polymer over time. The US government's National Toxicology Program has indicated that there is limited evidence that low doses of BPA can cause health problems and reproductive defects in humans.

Polycarbonates can generally be classified into two major categories: aromatic and aliphatic. Aromatic polycarbonates are prepared by the reaction of an aromatic diol with phosgene gas ($COCl_2$). (See FIG. 3; Howdeshell, K. L., et. al. "Bisphenol A is Released from Used Polycarbonate Animal Cages into Water at Room Temperature." Environ. Health Perspect. 111(9):1180-1187 (2003). Bisphenol-A is typically used as the aromatic diol and has been the subject of health concerns associated with its release from the polymer. It is currently not known if the source of bisphenol-A is through leaching of the monomer due to incomplete polymerization or hydrolysis of the polymer induced by heating and/or contact with acidic or basic materials.

Aliphatic polycarbonates are frequently used as bioresorbable materials for biomedical applications, such as medical implants and drug delivery carriers (see; Raigorodskii, I. M., et. al. Soedin., Ser. A. 37(3):445 (1995); Acemoglu, M. PCT Int. Appl., WO 9320126 (1993); Katz, A. R., et. al., Surg. Gynecol. Obstet. 161:312 (1985); Rodeheaver G. T., et. al., Am. J. Surg. 154:544 (1987) Kawaguchi, T., et. al., Chem. Pharm. Bull. 31, 1400:4157 (1983); Kojima, T., et. al., Chem.

Pharm. Bull. 32:2795 (1984). These materials generally show good biocompatibility, low toxicity, and biodegradability (Zhu, K. J., et. al., Macromolecules. 24:1736 (1991)). Poly alkylene carbonates have been synthesized by the reaction of aliphatic diols with phosgene (Schnell, H. Chemistry and Physics of Polycarbonates, Wiley, N.Y., 1964, p 9), the copolymerization of epoxides with carbon dioxide in the presence of organometallic catalysts (Inoue, S., Koinuma, H., Tsuruta, T. Makromol. Chem. 120:210 (1969)), the ring-opening polymerization of cyclic carbonate monomers (Hocker, H. Macromol. Rep., A31 (Suppls. 6&7), 685 (1994)), carbonate interchange reactions between aliphatic diols and dialkyl carbonates (Pokharkar, V., Sivaram, S. Polymer, 36:4851 (1995)), and the direct condensation of diols with $CO_2$ or alkali metal carbonates (see; Soga, K. et. al., Makromol. Chem. 178:2747 (1977); Rokicki, G., et. al., J. Polym. Sci., Polym. Chem. Ed., 20:967 (1982); Rokicki, G., et. al., Polym. J. 14:839 (1982); Chen, X., et. al., Macromolecules, 30:3470-3476 (1997)).

SUMMARY OF THE INVENTION

Described herein is a novel polycarbonate, poly(2-octadecyl butanedioate), and it related derivates, consisting of a carbon containing backbone containing carboxylate groups directly attached to the backbone. This structure is in stark contrast to existing polycarbonates as all existing polycarbonates are characterized by ester linkages between the monomeric units. Thus, the "carbonate" moiety of both aromatic and aliphatic polycarbonates exist in the linear chain or backbone of the polymer. This carbonate linkage has been removed from the backbone of poly(2-octadecyl butanedioate).

In summary, the characteristics of this polymer are not predicted by the literature and, as such, the use of the polymer to be used as a polycarbonate organic polymer in the manner described, is unexpected, and constitutes a new and unexpected use for the polymer. Contrary to the literature that teaches that this polymer should not work in the manner shown empirically, it has been demonstrated that the polymer, as herein described, functions in a new, unanticipated manner, and therefore comprises a new use for Polycarbonate.

While these compounds disclosed in the prior art fulfill their respective, particular objectives and requirements, the prior art does not describe the new and useful improvements in a polycarbonate organic polymer, and the method of use of Poly(2-Octadecyl-Butanedioic Acid) and the salts and esters thereof that allows the use of these compounds as a polycarbonate resin. In this respect, the polycarbonate organic polymer, and method of use of Poly(2-Octadecyl-Butanedioic Acid) and the salts and esters thereof according to the present invention substantially departs from the conventional concepts and compounds described in the prior art, and in doing so provides compounds primarily developed for the purpose of providing these compounds as a polycarbonate resin. Therefore, it can be appreciated that there exists a continuing need for new and improved polycarbonate organic polymers, and method of use of Poly(2-Octadecyl-Butanedioic Acid) and the salts and esters thereof which can be used as a polycarbonate resin. In this regard, the present invention substantially fulfills this need.

Poly(2-octadecyl-butanedioic acid) and the salts and esters thereof, prepared from polyanhydride PA-18 or other preparative means as would be evident to those skilled in the art, possess novel polycarbonate resin characteristics. Essential characteristics/benefits are summarized below.

The novel polycarbonates, poly(2-octadecyl butanedioate) and it related derivates, possess unique properties. In addition to the properties of existing polycarbonates, these compounds have an unexpected increased resistance to organic solvents, an unexpected increased impact strength, and an unexpected increased optical clarity. Further, these polycarbonates are biodegradable, can be extruded into strands, and injection molded.

The polymers, herein described, have several potential uses that are beneficial. These include all existing applications of polycarbonates, waterproof and chemically resistant fabric (exterior fabric, hospital sheets, chemical safety clothing), chemically resistant furniture, fixtures, and containers, and BPA-free food and beverage containers.

In view of the foregoing disadvantages inherent in the known types of polycarbonate resins now present in the prior art, the present invention provides improved polycarbonate organic polymers, and method and use of Poly(2-Octadecyl-Butanedioic Acid) and the salts and esters thereof. As such, the general purpose of the present invention, which will be described subsequently in greater detail, is to provide a new and improved polycarbonate organic polymer and method and use of Poly(2-Octadecyl-Butanedioic Acid) and the salts and esters thereof which have all the advantages of the prior art and none of the disadvantages.

To attain this, the present invention essentially comprises a polycarbonate resin comprising a polymer backbone. The backbone is a water insoluble, hydrophobic, aliphatic polymer structure. There are two sodium carboxylate groups or carboxylic acid groups per repeating unit that are directly bound to the polymer backbone. There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of formulation and to the arrangements of the components set forth in the following description or illustrated in the drawings. The invention is capable of other embodiments and of being practiced an carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other formulations, and methods for carrying out the several purposes of the present invention. It is important, therefore, that the claims be regarded as including such equivalent formulations insofar as they do not depart from the spirit and scope of the present invention. It is therefore an object of the present invention to provide new and improved polycarbonate organic polymers, and method of use of Poly(2-Octadecyl-Butanedioic Acid) and the salts and esters thereof which have all of the advantages of the prior art polycarbonate resins and none of the disadvantages.

It is another object of the present invention to provide new and improved polycarbonate organic polymers, and method of use of Poly(2-Octadecyl-Butanedioic Acid) and the salts and esters thereof which may be easily and efficiently manufactured and marketed.

It is a further object of the present invention to provide new and improved polycarbonate organic polymers, and method of use of Poly(2-Octadecyl-Butanedioic Acid) and the salts and esters thereof which are easily reproduced.

An even further object of the present invention is to provide new and improved polycarbonate organic polymers, and method of use of Poly(2-Octadecyl-Butanedioic Acid) and the salts and esters thereof which is susceptible of a low cost of manufacture with regard to both materials and labor, and which is accordingly is then susceptible of low prices of sale to the consuming public, thereby making such improved polycarbonate organic polymers, and method of use of Poly (2-Octadecyl-Butanedioic Acid) and the salts and esters thereof economically available to the buying public.

Even still another object of the present invention is to provide improved polycarbonate organic polymers, and method of use of Poly(2-Octadecyl-Butanedioic Acid) and the salts and esters thereof for the use of a polycarbonate resin for the making of injection and/or extrusion molded plastics.

Lastly, it is an object of the present invention to provide new and improved polycarbonate organic polymers, and method of use of Poly(2-Octadecyl-Butanedioic Acid) and the salts and esters thereof which can be extruded into strands.

These together with other objects of the invention, along with the various features of novelty which characterize the invention, are pointed out with particularity in the claims annexed to and forming a part of this disclosure. For a better understanding of the invention, its operational advantages and the specific objects attained by its uses, reference should be had to the accompanying drawings and descriptive matter in which there is illustrated preferred embodiments of the invention.

FIGURES

FIG. 1 is a drawing of the compound Poly(2-Octadecyl-Butanedioic Acid), showing the pertinent structure and formula. FIG. 1 is the first configuration of the compound and illustrates two potential carboxylic acid environments. In this figure, R1, R3, and R5 represent either substituted or unsubstituted alkyl, alkenyl, alkynyl, and aryl groups. The labile hydrogen atoms of the carboxylic acid groups can be replaced with a mono, di, tri, tetra, or other valent cation to form the corresponding carboxylate salts. Additionally, these carboxylic acid groups can be esterified to form the substituted or unsubstituted alkyl, alkenyl, alkynyl and aryl ester derivatives.

Figure 2:
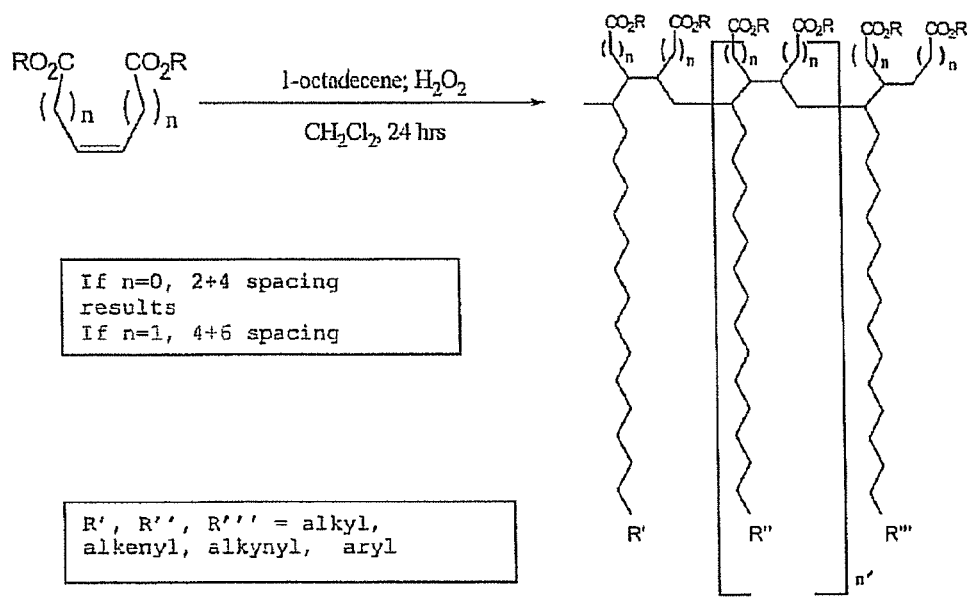

FIG. 2 shows an alternate synthesis of 2-Octadecyl-Butanedioic Acid Analogs. FIG. 2 is the second configuration of the compound. In this figure, R', R", and R''' represent either substituted or unsubstituted alkyl, alkenyl, alkynyl, and aryl groups. Additionally, the R group of the carboxylic acid represents hydrogen (to form the corresponding carboxylic acid), a mono, di, tri, tetra, or other valent cation (to form the corresponding carboxylate salts), or substituted or unsubstituted alkyl, alkenyl, alkynyl, and aryl groups (to form the corresponding esters).

Figure 3:
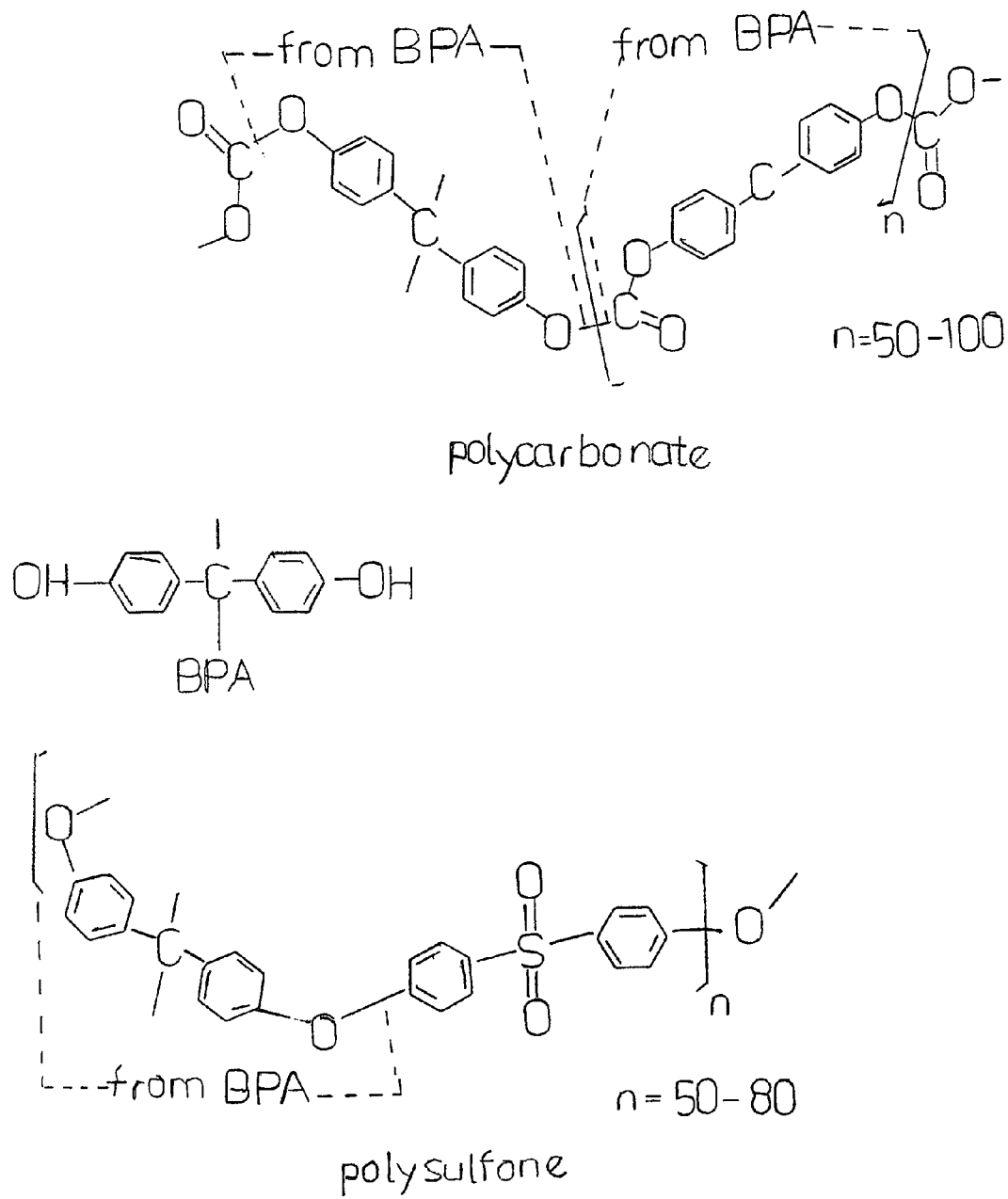

FIG. 3 is an aromatic Polycarbonate synthesized from Bisphenol-A (BPA) and Phosgene, showing the structure of BPA and partial structure of the copolymers polycarbonate and polysulfone shown by monomeric chain units (n) within brackets. Both the rigidity of the aromatic rings and the inherent flexibility of the C—O, C—S, and C—C single bonds are depicted. Polycarbonate is joined by ester linkages (O—C=O—O) whereas Polysulfone has ether linkages (C—O). For images of three-dimensional structures, refer to Edge et all (1994).

DESCRIPTION OF THE PREFERRED EMBODIMENT

Use of Poly(2-Octadecyl Butanedioate) and its corresponding acid and derivatives, as Polycarbonate resins, is herein described. As previously described, polycarbonate resins are generally tough thermoplastics with very high visual clarity and exceptionally high levels of impact strength and ductility. They also possess inherent fire resistance, relatively good resistance to UV light, good resistance to aqueous solutions of organic and inorganic acids and good resistance salts and oxidizing agents, but offer limited resistance to organic solvents. Typical properties include exceptional machinability, low water absorption, good impact resistance, non-toxic formulations, good thermal properties, superior dimensional stability, heat resistance, and transparency with thicknesses up to 2 inches.

Polycarbonate, while broadly used, is limited in specific instances and applications. As previously mentioned, polycarbonate typically shows good resistance (at room temperature) to water, dilute organic and inorganic acids, neutral and acid salts, and aliphatic and cyclic hydrocarbons. Polycarbonate does not resist attacks from alkalines, amines, ketones, esters, and aromatic hydrocarbons.

The polymer as herein described does not exhibit these limitations and may be used to make a strand, which can then be woven into a fabric or spun to make a yarn. The fabric may be used to make articles of clothing, or other such objects, such as bedsheets. The polymer may also be formed as a solid sheet, or solid object. Such sheets may be molded to form containers, or may be used as sheeting, such as in window replacement or protective shielding. Sheets of polymer may be used to form surfaces, such as protective surfaces for furniture. The forms in which the polycarbonate herein described may be used, such as strands, sheets, moldable sheets, containers, and solid objects, are collectively referred to as "constructs". The use of the word "constructs" therefore refers to such configurations of the polymer.

Described herein is a novel polycarbonate, poly(2-octadecyl-butanedioate), and it related derivates, consisting of a carbon containing backbone containing carboxylate groups directly attached to the backbone. This structure is in stark contrast to existing polycarbonates, as all existing polycarbonates are characterized by ester linkages between the monomeric units. Thus, the "carbonate" moiety of both aromatic and aliphatic polycarbonates exist in the linear chain, or "backbone", of the polymer. This carbonate linkage has been removed from the backbone of poly(2-octadecyl butanedioate).

The novel polycarbonates, poly(2-octadecyl butane-dioate) and its related derivates, possess unique properties. In addition to the properties of existing polycarbonates, these compounds have increased resistance to organic solvents, increased impact strength, and increased optical clarity. These enhanced characteristics are unexpected. Further, these polycarbonates can be extruded into strands and injection molded. As such, the herein described Polycarbonate presents the user with the unexpected properties, and unexpected results.

Potential applications include, but are not limited to, all existing applications of polycarbonates, the production of waterproof and chemically resistant fabric (exterior fabric, hospital sheets, chemical safety clothing), chemically resistant furniture, fixtures, and containers, and BPA-free food and beverage containers.

With reference now to the drawings, and in particular to FIG. 2 thereof, the preferred embodiment of the new and improved polycarbonate organic polymer, and method of use of Poly(2-Octadecyl-Butanedioate, sodium) embodying the principles and concepts of the present invention will be described. Simplistically stated, the polymer herein described comprises a plurality of reactive groups, being carboxylates or carboxylic acid groups. The reactive group is directly bonded to the carbon backbone. In the preferred embodiment a reactive group is bound-to a separate carbon atom. In other words, where there are two reactive groups, each reactive group is coupled to one of two carbon atoms, with (in the case of more than one reactive groups) the reactive groups not being coupled to the same carbon atom. The initial, or primary component, for the synthesis, is a commonly available, previously described component. The primary component may be prepared as follows:

1. The polycarboxylate is produced from the corresponding polyanhydride. The polyanhydride is produced by a process that is described and disclosed in U.S. Pat. No. 3,560,456, issued to S. M. Hazen and W. J. Heilman, entitled "Process of forming copolymers of maleic anhydride and an aliphatic olefin having from 16 to 18 carbon atoms." The description of the process as described in the '456 patent is incorporated herein by reference.

2. The polycarboxylate is produced from the polyanhydride by the following procedure: 10 grams of the polyanhydride PA-18 are dissolved in 200 ml of 4M NaOH and stirred at 85 degrees Centigrade for 2 hours. The reaction mixture is cooled, the pH adjusted to 6 to 6.5, and vacuum filtered. The solid polymer is washed with cold analytical grade methanol and dried under vacuum.

3. There are other methods to produce the polycarboxylate. One method is to produce the polyester. Subsequent hydrolysis of the polyester would produce the polycarboxylate. These reaction schemes would be obvious to someone skilled in the art of organic synthesis or polymer synthesis.

In the reaction sequence shown in FIG. 2, R in both the reactants and products may be a substituted or unsubstituted alkyl, alkenyl, alkynyl, or aryl group, such as methyl or ethyl, making both the reactants and products esters. The product above, in other embodiments, may be further modified by hydrolysis of the ester in either basic or acidic media to produce the polycarboxylate or polycarboxylic acid, respectively.

In the case of hydrolysis in a basic media, if sodium hydroxide is used, the sodium salt of the polycarboxylate ion is formed (designated as R=Na$^+$). Likewise, if potassium hydroxide is used, the potassium salt of the polycarboxylate ion results (designated R=K$^+$). If one carries out an acid catalyzed ester hydrolysis (acid is used in the second reaction above), then the polycarboxylic acid is produced (designated R=H).

In these polymers, the carboxylates or carboxylic acid groups are separated by 0 to 8 carbon atoms. In other embodiments, the number of carbon atoms between the carboxylates or carboxylic acid groups may be up to 20 carbon atoms.

In describing and claiming the uses, reference is made to a carboxylate group, or to a carboxylic acid group. In describing the carbon atoms which are chemically bound to such groups (carboxylic acid, or carboxylate) the carbon is referred to as the "bound-to" carbon atom. Reactive groups includes groups other than carboxylate groups or carboxylic acid groups. The term "reactive groups" is intended to include any reactive group which may attach to a carbon atom. Where reference is made to a carboxylate group, or carboxylic acid group, as being "bound-to" a carbon atom, the language is limited to only carboxylate groups and carboxylic acid groups.

With respect to the above description then, it is to be realized that one skilled in the art would be cognizant of equivalent relationships to those illustrated in the drawings and described in the specification, and such equivalents are intended to be encompassed by the present invention.

Therefore, the foregoing is considered as illustrative only of the principles of the invention. Further, since numerous modifications and changes will readily occur to those skilled in the art, it is not desired to limit the invention to the exact formulation and operation shown and described, and accordingly, all suitable modifications and equivalents may be resorted to, falling within the scope of the invention.

What is claimed as being new and desired to be protected by Letters Patent of the United States is as follows:

1. A method of using a polymer of formula:

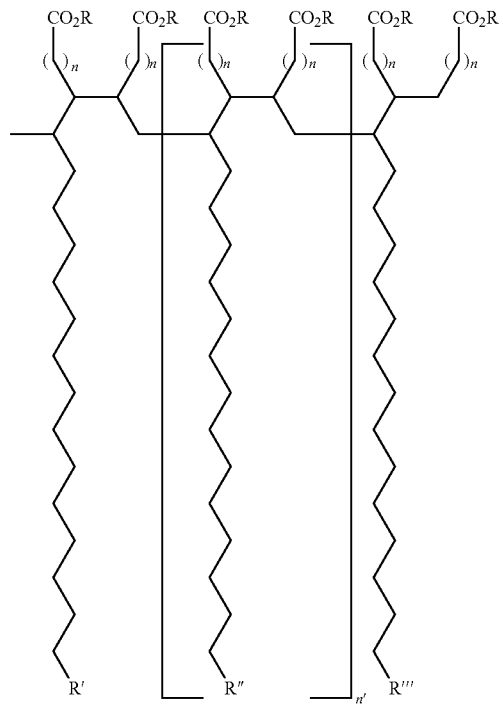

wherein n=integer number of methylene groups; n'=integer number of monomer units and n' is greater than 1; and R', R", R'"=alkyl, alkenyl, alkynyl and acyl; consisting essentially of:
producing the polymer;
forming the polymer to make a strand; and
using the strand to make a construct.

2. The method of using a polymer as described in claim 1 wherein the construct is a strand.

3. The method of using a polymer as described in claim 1 wherein the construct is a sheet.

4. The method of using a polymer as described in claim 1 wherein the production of the polymer is carried out by the hydrolysis of a polyester which results in the production of the polymerized polycarboxylate.

* * * * *